United States Patent [19]

Collin

[11] Patent Number: 4,474,057

[45] Date of Patent: Oct. 2, 1984

[54] PROCESS AND APPARATUS FOR CARRYING OUT A FUNCTION TEST, IN PARTICULAR AN EXHAUST GAS EMISSION TEST ON AN INTERNAL COMBUSTION ENGINE

[75] Inventor: Lars T. Collin, Moelndal, Sweden

[73] Assignee: Lars Collin Consult AB, Moelndal, Sweden

[21] Appl. No.: 435,750

[22] Filed: Oct. 21, 1982

[30] Foreign Application Priority Data

Oct. 26, 1981 [EP]  European Pat. Off. ........ 81810422.6

[51] Int. Cl.³ .......................................... G01M 15/00
[52] U.S. Cl. .................................................. 73/117.3
[58] Field of Search ...................... 73/117.3, 117, 116, 73/23

[56] References Cited

U.S. PATENT DOCUMENTS 4,195,514  4/1980  Collin .................................... 73/116
4,306,449 12/1981  Hoffman .............................. 73/116

Primary Examiner—Jerry W. Myracle
Attorney, Agent, or Firm—William R. Hinds

[57] ABSTRACT

The invention relates to a process and apparatus for carrying out function tests on internal combustion engines using the idle-acceleration method. In such a test, the engine is subjected to at least one acceleration cycle, in a condition of being disconnected from the load. The various moments of inertia of the engine, including clutch plates and flywheel, cause effective loading on the engine. In this way loading cycles may be simulated by varying the positive or negative acceleration value. The invention now proposes a preparation cycle before the actual test cycle. During the preparation cycle, the acceleration values which depend on the individual engine power output are measured and the actual test cycle is corrected in dependence on the result of the measurement operation, in such a way that the predetermined acceleration values and thus also the loading values are maintained.

10 Claims, 4 Drawing Figures

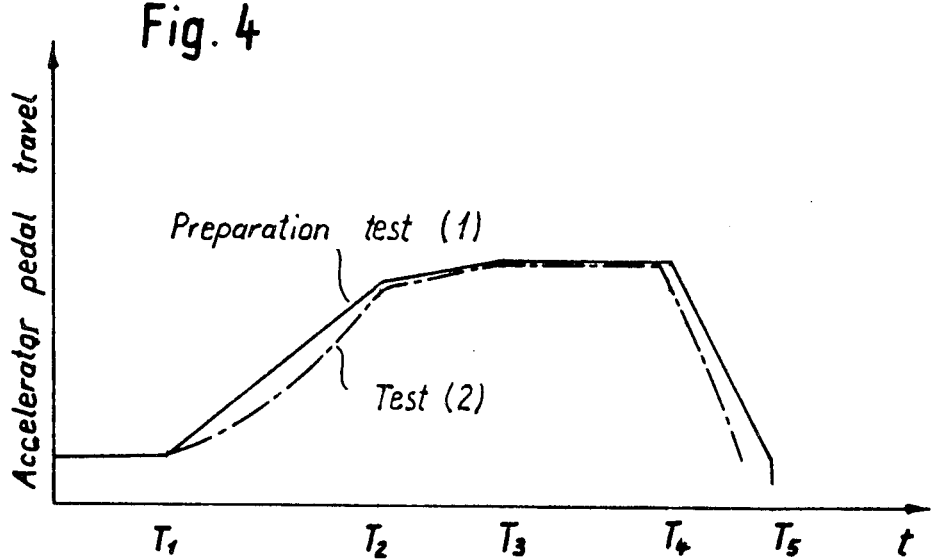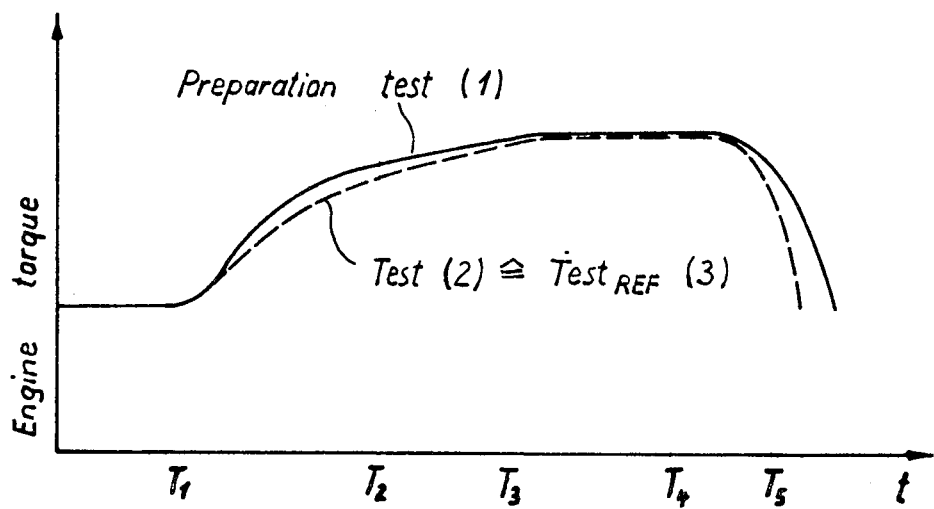

PROCESS AND APPARATUS FOR CARRYING OUT A FUNCTION TEST, IN PARTICULAR AN EXHAUST GAS EMISSION TEST ON AN INTERNAL COMBUSTION ENGINE

FIELD OF THE INVENTION

The invention relates to a process and apparatus for carrying out a function test, in particular an exhaust gas emission test on an internal combustion engine, by means of an idle-acceleration method in which the engine, in a condition of being disconnected from the load, is accelerated by a control means for at least one acceleration test cycle against its own moment of inertia, to simulate performance under load, wherein the control means, for controlling acceleration of the engine, changes the actuating means of the fuel feed means of the engine from at least a first fuel metering value, at a predeterminable speed of increase, to at least a second fuel metering value.

BACKGROUND TO THE INVENTION

Such processes and apparatuses are generally known and conventional and are described in particular in the applicant's following patent applications: DOS No. 25 09 411, DOS No. 27 37 049, DOS No. 27 58 411 and DOS No. 28 47 146. The disclosure of those specifications is hereby expressly incorporated in the present application.

In such exhaust gas emission tests, using the idle-acceleration method, in principle the internal combustion engine for example of a motor vehicle is put into the transmission idle position and the motor is then accelerated from an idle speed to a higher speed, by increasing the supply of fuel. In that operation, the torque produced by the engine causes acceleration of the masses of the engine and possibly a part of the transmission. In particular the rotary inertia of the crankshaft, the clutch plate and the flywheel permits effective loading of the engine, which simulates operating conditions (mean pressure). With these test methods, the frictional losses of the engine are either disregarded or taken into account, by means of a given factor, in the analysis or evaluation step. The moments of inertia which occur in the engine, and the torque produced, may be represented in the following manner:

$$J_{total} = J_{engine} + J_{transmission};$$

$$\phi = (d\omega/dt)$$

$$M_{engine} = J_{total} \cdot \phi$$

Instead of measuring exhaust gas emission, it is possible also to measure all other functions of the engine, which are dependent on load, such as for example noise emission or fuel consumption (that may be ascertained in known manner indirectly by measurement of the hydrocarbons in the exhaust gases).

SUMMARY OF THE INVENTION

It has now been found that the known processes may be further improved and in particular refined in regard to their measuring accuracy. More specifically, it has been found, in accordance with the invention, that certain deviations may occur in the measurement results, by virtue of the fact that the tested engines do not have the desired or reference torque values specified by the factory, but that in particular there are differences in torque production, due to wear and maintenance. If however an engine which is tested in that manner, has for example a lower power output than the reference power output, then, when the fuel feed means is actuated from a first metering value to a second metering value within a predetermined period of time, that engine will only reach a lower speed than a motor producing full power or even higher power. As, as stated above, the load on the engine depends only on the moment of inertia and acceleration, a lower engine speed during or at the end of a test cycle or a portion of the cycle means that an engine with a lower power output is also subjected to a lower test load than an engine producing full power. Such fluctuations can result in variations in the mean pressure which result in scatter or dispersions in the exhaust gas emission. In the case of rough or approximate tests, such fluctuations cause less difficulty, but when the requirements in respect of accuracy are high, the test result can be subject to large-scale variations, as a result.

Accordingly, the problem of the present invention is to provide a process and apparatus which improves the known idle-acceleration process and which in a very simple manner eliminates errors due to variations in torque output of the engines being tested.

DESCRIPTION OF THE PREFERRED FEATURES

In accordance with the invention, this is primarily achieved in that, before the acceleration-test cycle of the engine, at least one preparation cycle is carried out, during which the actuating means of the fuel feed means is actuated to cause acceleration of the engine and at the same time the acceleration in engine speed is measured during at least one period of time and the measured acceleration value is compared to a predetermined reference value, and that finally, in the event of a reference value deviation, subsequently thereto, the speed of actuation of the actuating means and/or at least one of the metering values of the actuating means is corrected, for the subsequent test cycle and/or a further preparation cycle, in a predeterminable relationship, in such a way that in the following cycle the actuating means is deflected more rapidly and/or is deflected to a higher fuel metering value if the acceleration during the preparation cycle is lower than the acceleration reference value or that the actuating means is deflected more slowly and/or to a lower fuel metering value if the acceleration during the preparation cycle is higher than the acceleration reference value.

In accordance with the invention therefore, the deflection of the fuel feed means during the test is corrected in a highly advantageous manner in such a way that the engines are subjected to a given and therefore also equal loading, by virtue of the moment of inertia. The moment of inertia itself is in fact known in regard to engines of a given type. In this respect therefore, the worse the acceleration of an individual engine, the greater is the deflection of the fuel feed means in order to produce given acceleration values of the inertia-producing rotary masses, within predeterminable periods of time. The performance of such tests and in particular also the programmed deflection of the fuel feed means is determined beforehand, while the desired loading can be individually established on the basis of the known moment of inertia of each type of engine. The predetermined program is then corrected, after carrying out at least one preparation cycle; it will be appreciated that it is also possible to perform a plurality of preparation cycles, during which the deflection of the fuel feed means is gradually so adapted as to achieve the predetermined acceleration values.

In addition to a positive test section with an increase in engine speed, the test cycle may advantageously also include a test section with negative acceleration, that is to say, a fall in engine speed, in order to be able to test the performance of the engine under particularly realistic conditions. For that purpose, the fuel feed only has to be throttled, with the engine being slowed down by frictional forces and in particular by the energy to be expended for the compression strokes. In this connection, controlling the feed of fuel during the retardation phase permits a reduction in the negative acceleration and permits it to be adapted to an acceleration reference value, if deviations occur.

The acceleration measuring operation may be carried out in a particularly simple manner if the time between at least two predeterminable engine speeds which are measured by a rotary speed measuring and storage means, is measured. It will be appreciated that engine acceleration may also be determined by the increase in engine speed or the difference in engine speed, within a predetermined period of time.

The man skilled in the art is readily aware of the fact that such acceleration measurement operations, based on measuring the speed of rotation, can be carried out, using micro-computers, in any individual steps or continuously. In the same way, the acceleration reference value may be stored over a longer time interval and in a plurality of individual discrete acceleration reference values, and compared to the measured actual value. It will be seen that, when using microprocessors, the respective engine torque can be calculated directly from the acceleration values if the moment of inertia of the internal combustion engine tested was stored in advance. In that case, it is then desirable also to store torque reference values in order to achieve a direct comparison between the actual value and the reference value, and make corresponding corrections.

It is particularly desirable if a maximum value is provided, in respect of the speed of increase of the actuating means. That ensures in particular that incorrect results are not produced by virtue of an example of an internal combustion engine, which is completely unsatisfactory from the point of view of power output, being subjected to more rapid acceleration cycles on the part of the fuel feed means, than is admissible in accordance with the dead times of the units (for example carburettor, lambda-probes etc).

A particularly advantageous apparatus for carrying out the idle-acceleration test of the general kind set forth in the opening part of this specification is provided when there is an acceleration measuring means which can be connected to the engine for measuring and storing the acceleration or the change in speed of the engine between at least two fuel metering values, when the acceleration measuring means is connected to a comparison arrangement which in turn is connected to a reference value generator in respect of engine acceleration or change in engine speed, and when the comparison arrangement is connected at its output to an actuation input of the control means for the fuel feed means in such a way that, in the event of a deviation in respect of the reference value, subsequently thereto, the speed of increase of the actuating means and/or at least one of the metering values of the actuating means is corrected, for the subsequent test cycle and/or a further preparation cycle, in a predeterminable relationship, in such a way that in the following cycle the actuating means is deflected more rapidly and/or is deflected to a higher fuel metering value when the measured acceleration value is lower than the acceleration reference value or that it is deflected more slowly and/or to a lower fuel metering value when the measured acceleration value is higher than the reference value, and that there is a test cycle control arrangement for controlling the performance of the preparation and test cycles.

In practice, in such an arrangement the acceleration measuring step may be carried out in a particularly simple manner if there is a rotary speed measuring and storage means comprising a differentiating means for forming the differential $d\omega/dt$, wherein $\omega$ represents the angular speed of the internal combustion engine, as measured by the rotary speed measuring means, after deflection of the fuel feed means, and $t$ is time. Conversion of an engine speed into electrical signals is generally conventional practice and is also used in rotary speed measuring means which are installed in motor vehicles. Differentiating means for differentiating electrical analog or digital signals are also known and conventional so that this gives a simple and accurate measuring arrangement.

It will be seen that the inventive content and technical advance of the subject-matter of this application are ensured both by the novel individual features and also in particular by combining and subcombining all features employed.

BRIEF DESCRIPTION OF THE DRAWINGS

The invention is described in greater detail hereinafter by means of an embodiment, with reference to the accompanying drawings in which:

FIG. 4 shows two diagrams which show the deflection of the accelerator pedal in dependence on time and the engine torque as a result of deflection of the accelerator pedal.

DESCRIPTION OF THE PREFERRED EMBODIMENTS

Figure 1:
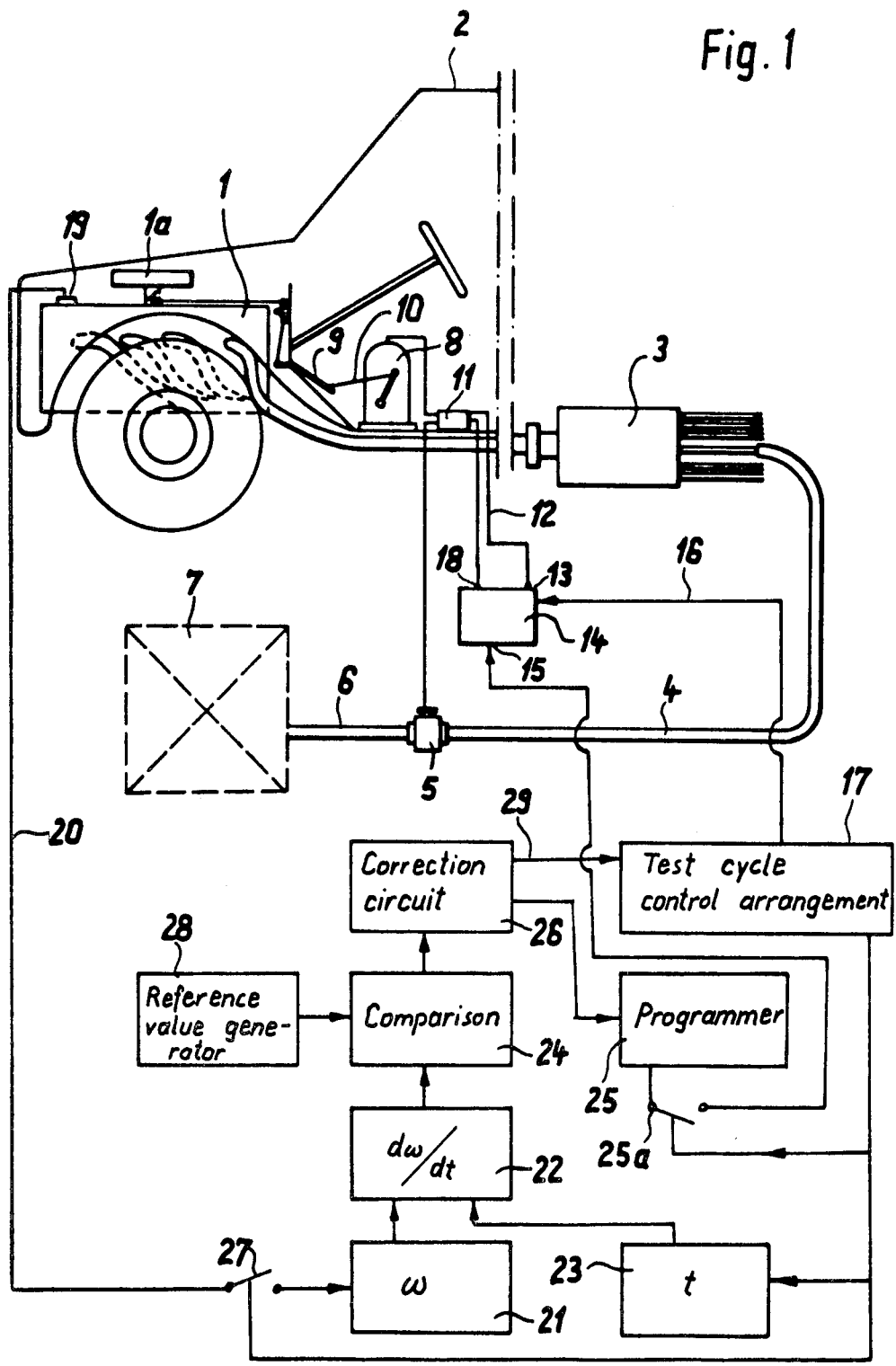
FIG. 1 is a diagrammatic view of an apparatus according to the invention, in conjunction with a passenger motor vehicle.

Referring to FIG. 1, the engine 1 of a vehicle 2 (not shown in greater detail) is connected by way of an exhaust 3, a connecting line 4, a valve 5 and a connecting line 6 to a measuring means 7 for measuring the content of noxious substances in the exhaust gases. The engine 1 is operated at idle and the transmission (not shown) is in the idle position. A control member 8 is fitted to the floor of the vehicle, for carrying out the test. The member 8 actuates the accelerator pedal 9 of the motor 1 by way of a linkage arrangement 10. The control member 8 comprises a servo motor (not shown) which is connected by way of a distributor 11 and a line 12 to the output 13 of a voltage supply means 14. The voltage supply means 14 has an actuating input 15. The voltage at the output 13 and thus the supply of power to the control member 8 can be varied by fluctuating input signals at the input 15. The voltage supply means 14 is also connected by way of a line 16 to a test cycle control arrangement 17. The test cycle control arrangement 17 generally controls performance of the entire test cycle and switches the voltage supply means 14 on and off. In addition, it controls the signals at a second output 18 of the voltage supply means, as on and off. The second output 18 is connected to the valve 5 by way of the distributor 11.

Provided on the engine 1 is a sensor 19 which senses the ignition pulses at the ignition coil and transmits them by way of a line 20 to a rotary speed measuring means or tachometer 21. The tachometer 21 is connected at its output to a differentiating means 22 which is also connected to a timer 23. The output of the differentiating means 22 is connected to a comparison arrangement 24 having a second input connected to a reference value generator 28. A given reference value acceleration procedure is stored in the programmer 25, according to the respective engine 1 and/or type of vehicle. Also stored in a programmer 25 is a set of control signals for actuating the accelerator pedal, the set of control signals depending on the respective type of vehicle and engine. However, the predetermined test program can be altered by a correction circuit 26.

It will be appreciated that engine speed may also be measured by signals being taken off at the contact breaker or at a sparking plug socket of the engine, or by using for example a light barrier arrangement. It would also be possible entirely to omit the tachometer 21 and to design the differentiating means 22 in such a way that it can be connected to a tachometer in the vehicle, and takes therefrom signals which are dependent on the engine speed. In addition, it will be appreciated that it is also possible to use any other control member 8 and to provide for example for hydraulic actuation. In addition, the control member 8 may be for example directly connected to the carburetor 1a of the engine, instead of being connected to the accelerator pedal 9. If the vehicle is supplied with fuel by way of an injection pump, then the injection pump can also be actuated directly.

In its operating procedure, operation of the apparatus as shown in FIG. 1 is as follows: first of all, the test cycle control arrangement 17 switches on the voltage supply means 14 for carrying out a preparation cycle, activates the general assembly, connects the programmer 25 by way of a switch 25a to the input 14 of the voltage supply means which thereupon actuates the control member 8 whereby the engine 1 is accelerated in accordance with the signals produced by the programmer 25. At the same time, the test cycle control arrangement 17 also closes a switch 27 so that the speed signals are passed to the tachometer 21 by way of line 20. Switching on the timer at the same time provides a time base for the differentiating means 22 which measures the time-dependent change in engine speed or engine acceleration. The differentiating means 22 feeds the detected acceleration values to the comparison means 24 which is supplied at its input with the acceleration reference values from the reference value generator 28.

Figure 2:
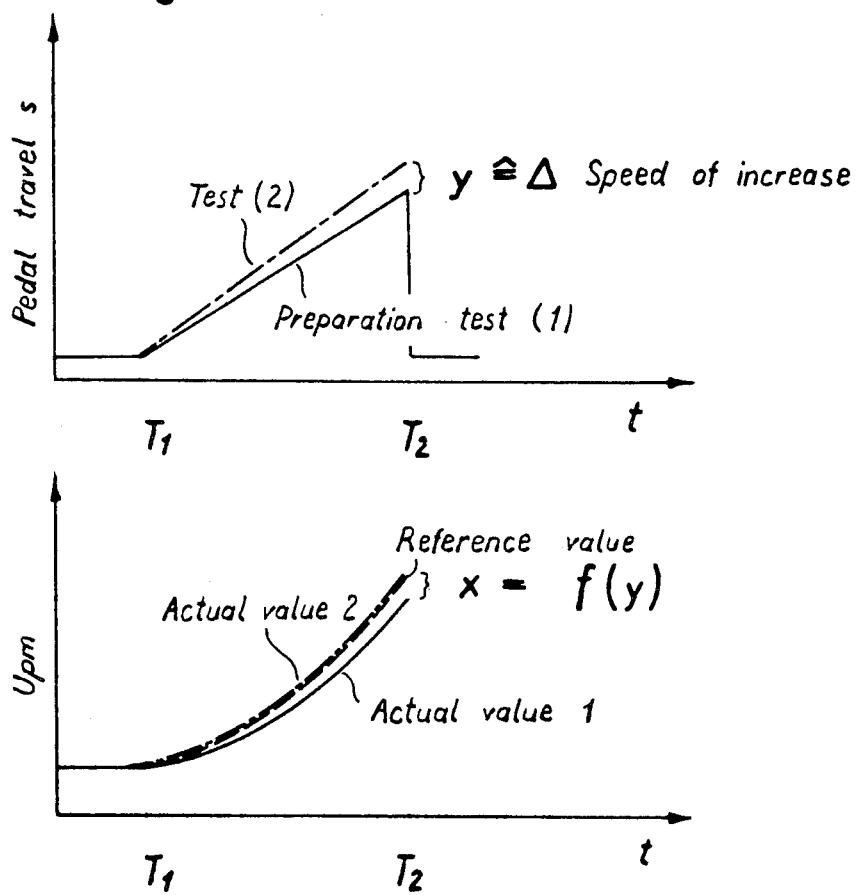
FIGS. 2 and 3 show diagrams of test runs.

The first graph in FIG. 2 shows the pedal travel S in the preparation test (1), in dependence on time. As illustrated, the pedal deflection movement is selected as a linear relation, but it will be appreciated that other curve configurations are also possible. The second graph in FIG. 2 shows the speed of rotation of the engine 1 in dependence on time. The speed actual value 1 shows the increase in speed or acceleration of the engine 1 during the preparation test, as actual value (1). The graph also shows, as a dash-dotted line, the acceleration reference value which is predetermined in the reference value generator 28, in respect of the engine 1. It will be seen that there is a considerable deviation between the two values, which is to be attributed to the fact that, because of some slight defect, the engine 1 does not produce the predetermined torque and is accordingly not capable of accelerating the rotary and other moving masses which determine its moment of inertia, to the predetermined engine speed, within the time provided for that purpose. That deviation between the reference value and actual value (1) is recorded in the comparison means 24 and a signal proportional to the deviation is outputted to the correction circuit 26. The correction circuit 26 in turn outputs an adjusting or control signal to the programmer 25 and also passes a signal by way of a line 29 to the test cycle control arrangement 17 which is thus informed about completion of the correction in the programmer 25. In addition, the test cycle arrangement 17 is so designed that, in the event of major deviations in acceleration, and thus large correction signals from the correction circuit 26, a second preparation cycle is carried out after the first preparation cycle in order to check whether the correction has resulted in the actual value 1 approaching the reference value (see FIG. 2). In addition, the test cycle control arrangement has a maximum value limiting means (not shown) which interrupts the entire test cycle and produces a fault or error signal as soon as the deviation detected in the comparison means 24 and thus the correction signal at the output of the correction circuit 26 exceeds a given maximum value. The interruption in the test draws the attention of the operators to the fact that the engine 1 shows an excessive deviation from the reference value, and is probably defective.

Figure 3:
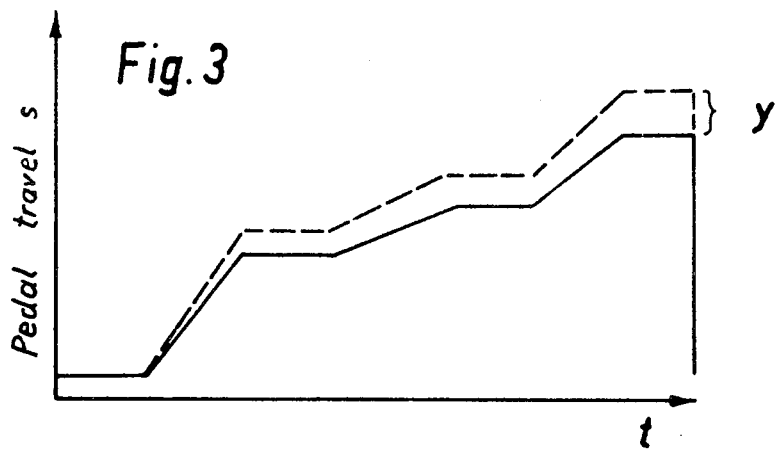

After the preparation cycle is concluded, the test cycle control arrangement 17 initiates the actual test run, wherein once again the voltage supply means 14 is switched on and in addition the valve 5 is also opened to connect the measuring means 7 for measuring the exhaust gas content of noxious substances, to the exhaust 3. The first graph in FIG. 3 shows the test (2) in the form of a broken line, in which respect it will be seen that the correction circuit 26 has so influenced the programmer 25 that a higher setting signal has been applied to the voltage supply means 14, whereby the control member 8 has been set more rapidly and to a higher final value. In this connection, the change in the speed of rise corresponds to the value Y shown in the first graph in FIG. 2. That correction value may be determined empirically for any given type of vehicle by suitable tests, in the course of which the dependency in respect of changes in speed of rotation under a given load, on the respective position of the accelerator pedal, is ascertained. It will be seen that the man skilled in the art will not face any difficulty, after the correction factor has been determined, in storing the correction factor in the correction circuit 26 so that the programmer 25 is actuated and corrected in accordance with the respective deviation. FIG. 2 also shows the actual value (2) of the increase in speed in the test. The altered movement of the accelerator pedal 9 in the test (compared to the preparation test) has caused an increase in engine acceleration, which virtually corresponds to the reference value curve. As soon as the test is concluded at time T2, the test cycle control arrangement 17 switches off the various components again, and in particular closes the valve 5 by switching off the voltage supply means 14 so that the measuring means 7 is separated from the exhaust 3. That therefore ensures that only exhaust gases which are produced during the period T1 to T2 are collected in the measuring means 7. As the vehicle was put to the reference acceleration curve (FIG. 2) during the test, this procedure also ensures that the engine load required for the test, produced by the inherent moment of inertia of the engine, corresponds to the reference value.

FIG. 3 shows a further graph illustrating that obviously any test cycles can be performed, with merely a change in the programmer 25 and the reference value generator 28. The acceleration values of the engine 1 during such a test may be determined either only taking account of the initial and final speed of rotation in the preparation cycle, or they may be measured continuously, for example integrated and compared to the reference value. That entirely depends on the requirements of the particular situation, the duration of the preparation test, the linearity of the variation in rotary speed and the nature of the test run. Such steps are readily known to the man skilled in the art and are conventional practice.

The first graph in FIG. 4 shows the travel of the accelerator pedal initially during the preparation test (1), over the period of time T1 to T5. The test cycle comprises two time intervals T1 to T3 with positive acceleration, a time interval T3 to T4 without acceleration, and a time interval T4 to T5 with negative acceleration. In that test, the moment of inertia of the engine 1 is also stored in the reference value generator 28 and, before the comparison operation in the comparison means 24, the two reference acceleration values are also each multiplied by the moment of inertia. As the moment of inertia for all engines of a given type of a make of motor vehicle is the same and can be predetermined, that does not cause any problems using the formula already set out above, the torque is represented by the product of $J_{total} \times (d\omega/dt)$. Therefore, the second graph shown in FIG. 4 shows the engine torque which is detected as an 'answer' to the deflection movement of the accelerator pedal as shown in the first graph. As will be apparent in that respect, the engine torque in the preparation test (1) deviates from the reference value (3) which is shown in broken line. The two graph lines are curved as the test is carried out over a larger part of the torque curve than the test shown in FIG. 2, whereby the non-linearity of the torque curve is clearly indicated. The correction circuit 26 is programmed with correction values, on the basis of empirical checks on the torque performance of the engine 1. The correction values take account of the non-linearity when correction signals are applied to the programmer 25. As it has been found in the preparation test that the engine 1 has a higher torque production than was typically to be expected for that engine, the correction made is negative, that is to say, the variation due to the accelerator pedal and also the accelerator pedal return movement between T4 and T5 (shown in dash-dotted lines as test 2) rises and falls in a flatter configuration and 'below' the line of the preparation test. As shown in the second graph, the engine torque during test (2) entirely follows the reference value (3).

I claim:

1. A process for effecting a function test, for example an exhaust gas emission test, on an internal combustion engine furnished with fuel feed means for metering fuel to the engine, actuating means for said fuel feed means and automatic control means for said actuating means, the process being effected when the engine is disconnected from any external load and comprising at least one preparation test cycle including operating said control means to effect the actuation of said actuating means to increase fuel metering values at a predeterminable speed from a first value to a second value determined by said fuel feed means, thereby accelerating the engine against the load constituted by its own moment of inertia, simultaneously measuring the consequent acceleration in engine speed during at least one measured period of time, comparing the acceleration value measured in said period of time with a predetermined reference value and, in the event of a deviation between said acceleration value and said reference value, correcting at least one of the parameters consisting of the speed of actuation of said actuating means and at least one of said metering values, to an increased value if said acceleration value during said preparation test cycle is lower than said reference value and a decreased value if said acceleration value during said preparation cycle is higher than said reference value, and thereupon effecting a further test cycle with at least one said corrected parameter.

2. A process according to claim 1, in which the speed of actuation of said actuating means is limited.

3. A process according to claim 1, in which a first predetermined engine speed, a second predetermined engine speed and a measurement of the time interval between the occurrence of said first and second engine speeds determine said acceleration value.

4. A process according to claim 1, in which said preparation test cycle includes a further acceleration measurement subsequently to the actuation of said actuation means to determine said second metering value, said further acceleration measurement being made by measuring the increase in speed between at least two predeterminable times.

5. A process according to claim 1, in which said acceleration value and said reference value are functions respectively of a torque curve obtained during the acceleration of the engine and a torque reference value curve, at least one of said parameters being corrected in dependence on deviation between said torque curves.

6. A process according to claim 1 in which said preparation test cycle is followed by a second preparation test cycle wherein the engine is decelerated by actuating said actuating means to reduce the metering value determined by said fuel feed means and comparing the deceleration during a measured period of time with a deceleration reference value.

7. Apparatus for effecting a function test, for example an exhaust gas emission test, on an internal combustion engine when disconnected from any external load by accelerating the engine for at least one preparation acceleration test cycle against its own moment of inertia, to simulate performance under load, the apparatus comprising fuel feed means for metering fuel to the engine, actuating means for said fuel feed means, automatic control means for said actuating means, acceleration measuring means for connection to the engine and connected to said control means for measuring and recording the acceleration of the angine between at least two fuel metering values determined by said actuating means a comparison arrangement connected to said acceleration measuring means, a reference value generator connected to said comparison arrangement enabling said comparison arrangement to compare the actual acceleration of the engine as determined by said acceleration measuring means and a reference value and to output a deviation value representing any difference between said acceleration value and said reference value, and correction means connected to receive said deviation value and connected to said control means for adjusting the subsequent actuation of said actuating means to compensate for said deviation value, whereby one of the parameters, consisting of the speed of actuation of said actuating means and at least one of said metering values, is corrected for a further test cycle in a predeterminable relationship in such a way that at least one of said parameters is corrected to a higher value if said acceleration value is lower than said reference value and to a decreased value if said acceleration value is higher than said reference value.

8. Apparatus according to claim 7, in which said acceleration measuring means include engine revolution speed measuring and recording means for measuring the period of time between at least two predeterminable engine speed values.

9. Apparatus according to claim 7, in which said acceleration measuring means include engine revolution speed measuring and recording means for measuring the engine speed after a predetermined period of time.

10. Apparatus according to claim 7, in which said acceleration measuring means include means for measuring the engine revolution speed ($\omega$), means for measuring a period of time (t) subsequent to the initiation of said preparation acceleration test cycle and differentiating means for forming the differential ($d\omega/dt$).

* * * * *